United States Patent [19]
Skjaeveland

[11] Patent Number: 6,138,771
[45] Date of Patent: Oct. 31, 2000

[54] TINE FOR MOUNTING ON SOIL-WORKING IMPLEMENT

[75] Inventor: Magne Skjaeveland, Kvernaland, Norway

[73] Assignee: Kverneland Klepp, AS, Kvernaland, Norway

[21] Appl. No.: 09/125,478

[22] PCT Filed: Jan. 14, 1998

[86] PCT No.: PCT/GB98/00026

§ 371 Date: Apr. 30, 1999

§ 102(e) Date: Apr. 30, 1999

[87] PCT Pub. No.: WO98/31208

PCT Pub. Date: Jul. 23, 1998

[30] Foreign Application Priority Data

Jan. 15, 1997 [GB] United Kingdom ................... 9700754

[51] Int. Cl.[7] .................................................. A01B 23/00
[52] U.S. Cl. .......................... 172/708; 172/720; 172/765
[58] Field of Search ................................. 172/685, 713, 172/699, 762, 705, 707, 708, 711, 643, 720, 721, 722, 725, 730, 765

[56] References Cited

U.S. PATENT DOCUMENTS

| | | | |
|---|---|---|---|
| 778,108 | 12/1904 | Butts ...................................... | 172/708 |
| 2,202,929 | 6/1940 | Silver ..................................... | 172/705 |
| 2,586,255 | 2/1952 | Pleskac . | |
| 2,855,836 | 10/1958 | Sutherland ............................. | 172/708 |
| 2,918,132 | 12/1959 | Neikirk et al. ......................... | 172/736 |
| 2,992,690 | 7/1961 | Rabuse .................................. | 172/720 |
| 3,148,738 | 9/1964 | Shelton ................................. | 172/699 |
| 4,185,699 | 1/1980 | Lewison ................................ | 172/705 |
| 4,577,568 | 3/1986 | Netsch ................................... | 111/7 |
| 4,624,196 | 11/1986 | Anderson .............................. | 111/52 |
| 4,834,190 | 5/1989 | Kyle ...................................... | 172/708 |
| 5,531,277 | 7/1996 | Noonan et al. ........................ | 172/730 |

FOREIGN PATENT DOCUMENTS

| | | | |
|---|---|---|---|
| 63173/65 | 2/1968 | Australia . | |
| 48373/79 | 1/1980 | Australia . | |
| 571859 | 4/1988 | Australia . | |
| 333237 | 5/1928 | Belgium . | |
| 0 770 319 A1 | 5/1997 | European Pat. Off. . | |
| 469.724 | 3/1914 | France ................................... | 15/11 |
| 1069374 | 7/1954 | France . | |
| 466397 | 10/1928 | Germany . | |
| 467989 | 10/1928 | Germany . | |
| 816771 | 10/1951 | Germany . | |
| 1806494 | 4/1993 | U.S.S.R. ............................... | 172/705 |
| 2145313 | 3/1985 | United Kingdom .................. | 172/707 |
| 2 176 083 | 12/1986 | United Kingdom .................. | 5/6 |
| WO 95/02315 | 1/1995 | WIPO . | |
| WO 98/03053 | 1/1998 | WIPO . | |

Primary Examiner—Thomas B. Will
Assistant Examiner—Nathan Mammen
Attorney, Agent, or Firm—Workman, Nydegger & Seeley

[57] ABSTRACT

A tine for mounting on an agricultural soil-working implement includes a mounting portion at the upper end of the tine for mounting the tine in cantilever manner on a frame portion of the implement. A shank portion projects downwardly from the mounting portion to a lower end. A tine point is mounted on the lower end of the shank portion. The tine point comprises a cutting blade extending generally in a vertical plane and has a leading edge and a trailing edge. The leading edge is adapted to cut a slit in the ground during forward travel of the implement. The cutting blade has first and second laterally projecting wing formations formed on the trailing edge. The first wing formation extends to a first side of the cutting blade and is operative to widen the slit formed by the leading edge. The second wing formation extends to a second opposite side of the cutting blade and is secured to the shank portion.

16 Claims, 5 Drawing Sheets

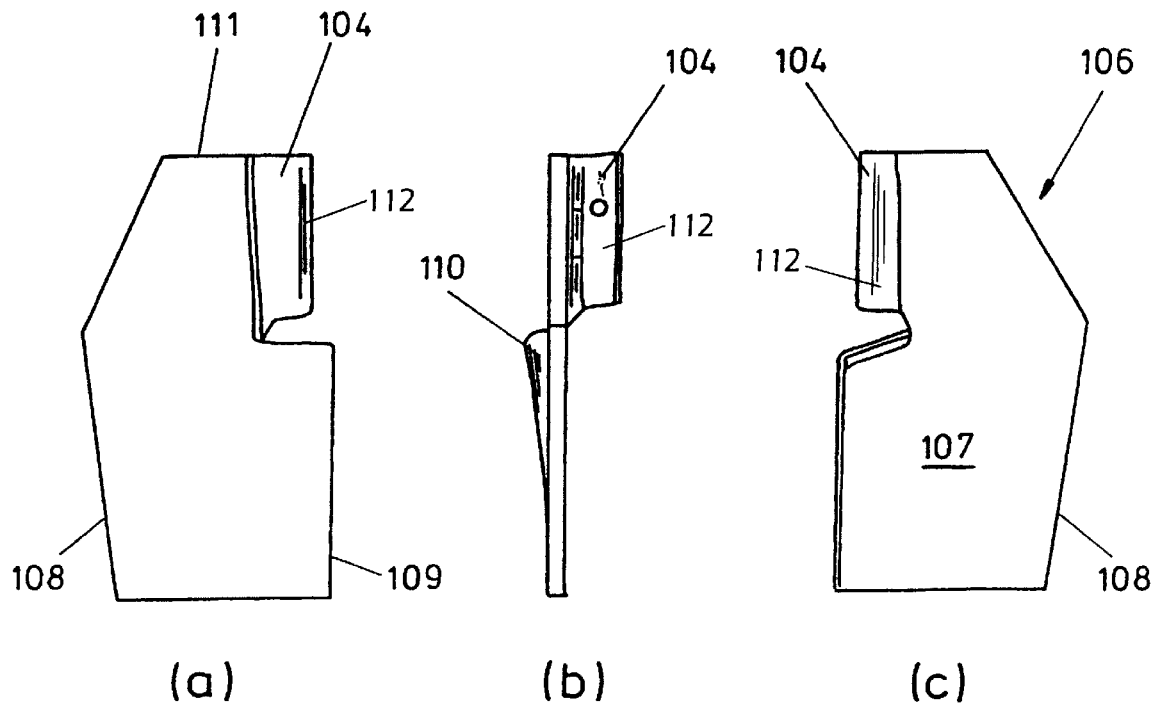
FIG. 5
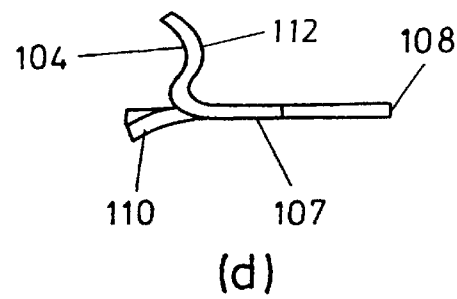
(d)
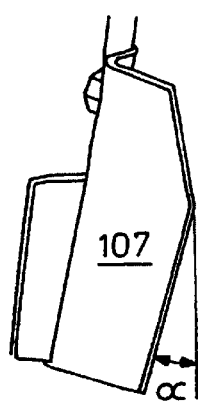
FIG. 6
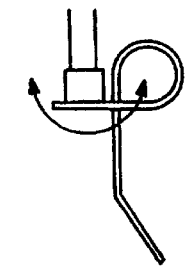
FIG. 7

TINE FOR MOUNTING ON SOIL-WORKING IMPLEMENT

This invention relates to a tine for mounting on a soil-working implement, and which is intended to work the soil and make it ready for subsequent seeding.

There are many different types of soil-working implements which are used in agriculture, including ploughs, harrows (including power harrows), cultivators and packers, such implements being used singly for some operations, and in other circumstances being used in multi-working operations in a single pass when incorporated as integrated combinations. Examples of integrated combinations include reversible plough/packer combinations e.g. as disclosed in WO95/02315.

It is of course well known to mount soil-working tines on agricultural implements, and which usually are used to further work partly worked soil e.g. after ploughing. It is also known to mount tines on direct drilling implements. The tines project downwardly of their mountings on the frame of the implement and into the soil, and by being pulled forwardly through the ground exert a working action on the soil which breaks-down the soil e.g. into smaller soil clods and lumps, as part of the preparations to make the soil ready for seeding. Subsequent working of the soil may be necessary by use of packers, either as separate operations, or by incorporating packers into integrated harrow/packer combinations.

Tines are usually made of spring steel, and the inherent resilience of a tine allows it to be pulled through the ground to carry out a working operation, and if particularly resistant ground conditions are encountered e.g. hard-baked clay, buried stones, or large clods, the tine is able to deflect under load so as to minimise risk of damage. The ability of the tine to yield temporarily also stores-up additional spring energy in the tine which also assists in the working operation in difficult conditions.

The inherent resilience of a tine is achieved partly by rigid securement of the upper end of the tine, and which projects downwardly from its mounting in cantilever manner, and which allows resilient deformation of the downwardly projecting portion of the tine and the tine end in any direction. If additional resilience is required i.e. to permit further resilient yielding of the tine end (and also further temporary storage of spring energy), the upper end of the tine may include spring coils, or other energy storage devices.

One particularly challenging set of soil-working conditions for a tine applies when working the harder and tougher soils having a large proportion of clay present. During dry conditions, the presence of clay in the soil results in the formation of large lumps during working e.g. following ploughing, and which are hard to break-down during subsequent working by tines. By contrast, during moist or wet conditions, following ploughing, the soil hardly breaks-down at all into separate lumps.

The traditional way of working "difficult" soil conditions i.e. having a large proportion of clay present, has been to carry out initial working of the soil by ploughing in the autumn, and then to let the winter weather act on the ploughed ground to carry out initial breaking-down of the ploughed soil. Thus, the action of rain and frost over the winter period can cause a partial breaking-down of the ploughed ground, and subsequent working of the ground in the spring with a harrow can then make the soil ready for seeding. Often, it is necessary for up to six separate harrowing operations to make the soil ready for seeding, and evidently substantial labour, fuel and equipment costs are involved in this traditional method. It is also weather dependent, in that not only must there be suitable weather prevailing for autumn ploughing, but also for the subsequent harrowing in the spring.

It is also common practice, prior to harrowing, to use heavy rollers, with massive cylinders or packer rings, to try to crush or break-down some of the lumps of soil. Power harrows also may be used, although this requires a higher consumption of power and time.

However, despite the difficulties of working with these hard soils, there are clear economic advantages (when satisfactory working of the difficult soil is achieved) as compared with working with easier or "lighter" soils e.g. sandy soils, since the presence of clay in a fully worked seedbed gives a more fertile soil. This is obtained because, with the presence of clay in the soil, this often serves to retain humidity better in the summer than lighter soils.

There is therefore a clear need to provide:
1. an agricultural implement of great strength and having very effective soil-working tines to work these difficult soils; and
2. in a way which can reduce the overall time (labour) cost in making the soil ready for seeding.

The present invention therefore has been developed with a view to providing an improved design of tine for mounting on a soil-working agricultural implement, and which is effective in working in difficult or hard soil conditions, and which can reduce the overall time required to make such soil ready for seeding.

A tine according to the invention may be mounted on any suitable soil-working implement, (and preferably incorporated in one or more sets or rows of tines), and in which the implement may be a harrow or soil cultivator, or a soil-working component of an integrated combination. By way of example only, reference may be had to the description of soil-working implements disclosed in WO95/02315, EPA 96306433.2 and GB patent application No 9614991.9 filed Jul. 17, 1996, and in which a tine according to the invention can be provided with particular advantage.

According to the invention there is provided a tine for mounting on an agricultural soil working implement and which comprises:
   a mounting portion at the upper end of the tine for mounting the tine in cantilever manner on a frame portion of the implement;
   a shank portion projecting downwardly from the mounting portion; and,
   a tine point mounted on the lower end of the shank portion;
   the tine point comprising:
      a cutting blade extending generally in a vertical plane and having leading and trailing edges;
      the leading edge being adapted to cut a slit in the ground during forward travel of the implement;
      the cutting blade having first and second wing formations formed on the trailing edge;
      the first wing formation being operative to widen the slit formed by the leading edge; and,
      the second wing formation being secured to the shank.

The second wing formation can be located above ground during use.

Preferably, the connection between the second wing formation and the cutting blade is resiliently deformable.

The tine point can be a unitary plate construction.

Preferably, the second wing formation has a trough-like mounting recess formed therein, the recess being adapted to receive the lower end of the tine shank.

The tine can have a single fastener which secures the shank end non-rotatably in the recess.

The mounting portion of the tine can include a coiled spring formation.

Preferably, the first wing portion extends laterally outwardly of said trailing edge of the blade in one direction, and the second wing portion extends laterally outwardly of the trailing edge in an opposite direction.

In a further preferred arrangement, the lower edge of the second wing portion is located at or close to the same level as the upper edge of the first wing portion.

In a preferred arrangement, an agricultural machine for carrying out soil working operations incorporates at least one row of tines as defined above.

The agricultural machine can include one or more rows of seed and/or fertiliser distributing coulters which is/are mounted on the apparatus rearwardly of the at least one row of tines.

A preferred embodiment of tine for mounting on a soil-working implement will now be described in detail, by way of example only, with reference to the accompanying drawings, in which.

FIGS. 5a to 5d comprise, respectively, view from one side, end view, view from opposite side, and plan view of a ground-working plated end of the tine;

FIG. 6 is a perspective illustration of a modification of the plated end of the tine; and, FIG. 7 is a view of a further modification.

Figure 1:
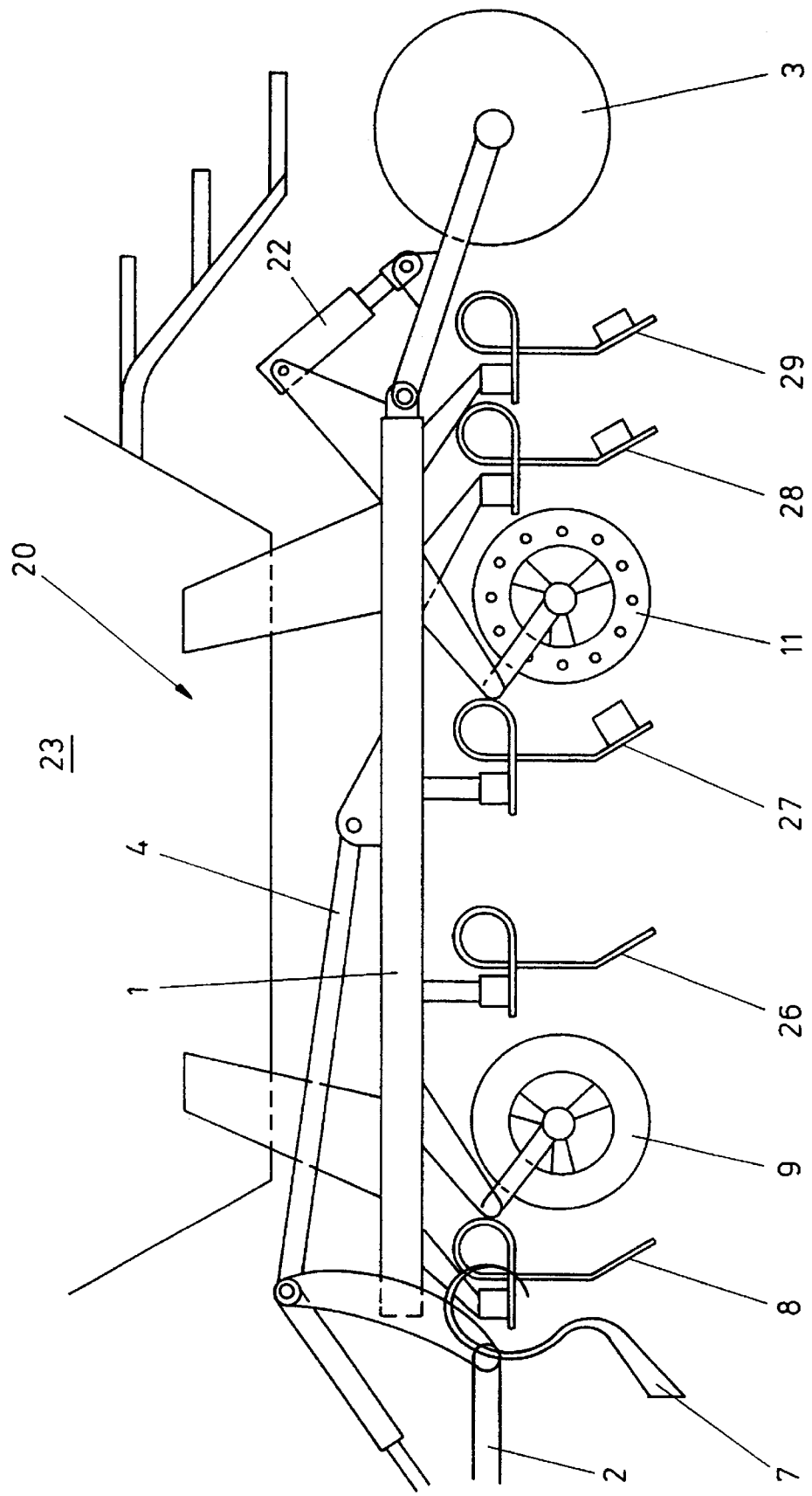
FIG. 1 is a schematic side view of a trailed seedbed cultivator, having at least two different types of soil-working tool mounted thereon, and comprising one example only of a soil-working cultivator in which a tine according to the invention may be mounted in one or more sets or rows of tines.
Figure 2:
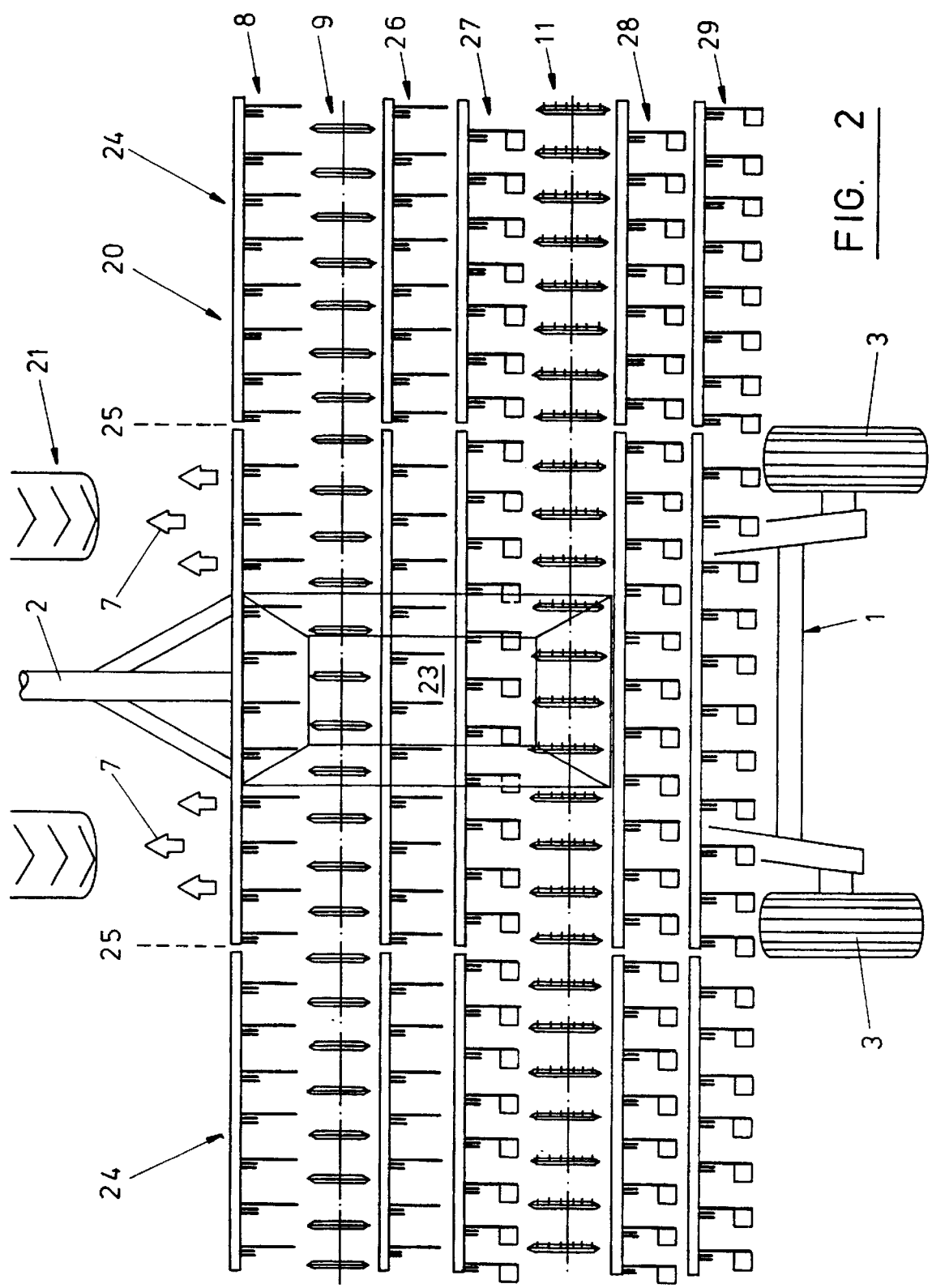
FIG. 2 is a diagrammatic plan view of the cultivator shown in FIG. 1.

Referring first to FIGS. 1 and 2 of the drawings, this shows one example of soil cultivating apparatus which may be provided with one or more sets or rows of soil-working tine according to the invention. The apparatus is a trailed integrated or combination type of soil cultivating apparatus, which is designated generally by reference 20 and which is intended to be coupled to the rear of a tractor or other propelling vehicle 21, and to carry out a number of different soil-working operations during forward movement of the apparatus 20 by the vehicle 21.

The apparatus 20 comprises a main frame 1, and which usually will have a length of about 3 meters, in order to mount the number of rows of soil-working tools which are required to be mounted on the frame 1, and spaced apart from each other along its length i.e. spaced apart from each other with respect to the direction of forward travel of the apparatus. A coupling arrangement is provided at the forward end of the frame 1, to couple the apparatus to the rear of the vehicle 21, and in the illustrated arrangement is shown schematically by drawbar 2.

As can be seen in FIGS. 1 and 2, a number of separate rows of harrow tines are mounted on the frame, and comprising a forward row of "levelling" tines 8, front and rear sets of intermediate tines 26 and 27, and a rearward pair of rows of tines 28 and 29. The tines 28 and 29 are incorporated into coulters for the purposes of seed distribution at required planting depths, and the rear set of intermediate tines 27 are incorporated into fertiliser distributing coulters. Track looseners 7 are mounted in front of the tines of the foremost row 8, as shown schematically.

In addition to the rows of tines, the frame of the apparatus also has mounted thereon a packer 9 comprising a set of axially spaced packer discs or rings, mounted behind the foremost row of tines 8, and there is also a further packer 11, composed of sets of spaced packer discs, and which is arranged between the rows 27 and 28.

FIG. 2 is a diagrammatic plan view of the soil-working tools of the apparatus, and FIG. 1 is a schematic side view. It can be seen in particular from the side view of FIG. 1 that the tines in each of the rows 8, 26, 27 and 28 are of the same design, and are of circular cross section, and similar to "finger tines" used on a harrow.

The foremost row 8 of tines comprise hydraulically adjustable "levelling tines", whose depth can be adjusted, and which are capable of carrying out a preliminary soil-working action, and which replaces the action normally provided by a known forwardly mounted "levelling board".

Having described one example of a soil cultivating apparatus, with reference to FIGS. 1 and 2, there will now be described a preferred embodiment of tine according to the invention, with reference to FIGS. 3 to 5. One or more sets of the design of tine shown in FIGS. 3 to 5 may be incorporated in the apparatus 20, or other soil-working implement.

The tine is designated generally by reference 100, and will be rigidly mounted in cantilever manner at its upper end 120, and the main shank 101 of the tine projects downwardly therefrom, and mounts a tine end 102 which comprises a cutting plate which can be drawn through the ground so as to exert a cutting and working operation on the soil, during forward movement of the apparatus.

The upper mounting end 120 of the tine 100 includes a multi-turn coil 103, which gives additional resilience to the tine, and also serves to store temporarily spring energy, when the tine shank 101 deforms under load. The tine end 102 comprises a new design of tine point, formed from a plate which is formed and hardened, and then fastened securely to the lower end of the tine shank 101, as can be seen particularly in the exploded view of FIG. 4. A mounting groove 104 is formed in the second wing formation, in which the lower end of tine shank 101 can be securely mounted, when secured thereto by a single fastener 105 in such a way that the tine end 102 cannot rotate relative to the end of the tine shank 101. This is a simple but effective means of rigidly coupling together the tine point 102 to the tine shank 101. This is achieved by fastening of the fastener 105, in combination with the tight fitting engagement of the lower end of the tine shank 101 within the groove 104, between the V-shaped walls thereof which embrace the tine shank ends.

Figure 4:
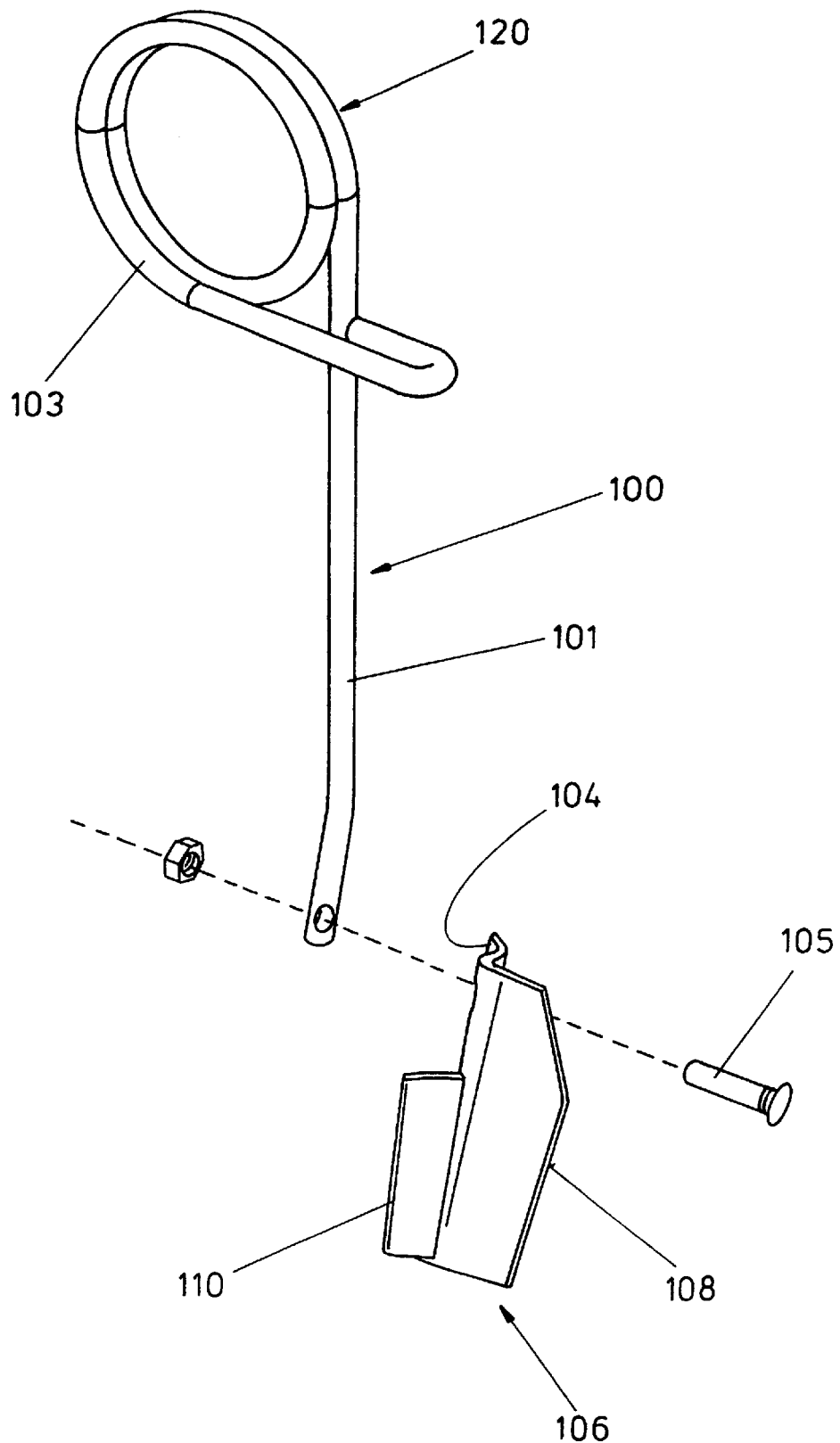
FIG. 4 is an exploded view of the component parts of the tine shown in FIG. 3.

The tine end 102 is formed from a single plate 106, which is shaped to take-up the form shown particularly in FIGS. 4 and 5. The plate 106 has a cutting blade 107, which has a V-shaped leading edge 108, as shown in FIG. 5c, and which is able to cut through the soil like a knife, whereas the trailing edge 109 includes first and second laterally protecting wing formations 110, 112. The first laterally extending wing formation 110 extends from the bottom edge 112 of the plate 106 to a point located approximately mid-way between the top and bottom edges 111, 112. The first laterally extending wing formation 110 curves out of the plane of the cutting blade 107 in a first direction. The radius of curvature of the wing formation 110 decreases from the bottom to the top edge of the plate 106. This first laterally projecting wing formation 110 has the function of opening-up the slit formed in the soil by the leading edge 108.

The second laterally extending wing formation 112 extends from the top edge of the plate 106 to the top edge of the first wing formation 110. There is a small gap between the second and first wing formations. The second laterally extending wing formation 112 curves out of the plane of the cutting blade 107 in a second direction opposite to the direction of curvature of the first wing formation 110. Therefore, the first and second wing formations 110, 112 are located on opposite sides of the plane of the cutting blade 107. The radius of curvature of the connection between the plate 106 and the second wing formation 112 is substantially constant along its length.

In use, the tine 100 is arranged with the first wing formation 110 positioned in the soil and the second wing formation 112 positioned above it. As a tine 100 is pulled through the soil the leading edge 108 cuts a slit in the ground. The soil on one side of the slit is then pushed laterally by the first wing formation 110 so widening the slit. As the soil it pushed laterally it applies a force to the first wing formation 110 so slightly rotating the cutting blade 107 about the axis of the shank 101. As the cutting blade 107 rotates a restoring force is generated by the deformation of the connection between the second wing formation 112 and the plate 106. The cutting blade 107 therefore comes into equilibrium at an angle slightly oblique to the direction of motion of the tine 100 through the soil.

When the tine 100 passes through a particularly resilient patch of soil then the force in the first wing formation 110 will suddenly increase. This causes the blade 107 to rotationally vibrate about the axis of the shank 101. The leading edge 108 of the cutting blade 107 is located remote from the shank 101 and therefore the rotational vibration of the cutting blade 107 causes lateral vibration of the leading edge 108. This lateral vibration of the leading edge 108 breaks-up the side wails of the slit, widening this slit and facilitating ploughing through this particularly difficult patch.

Figure 3:
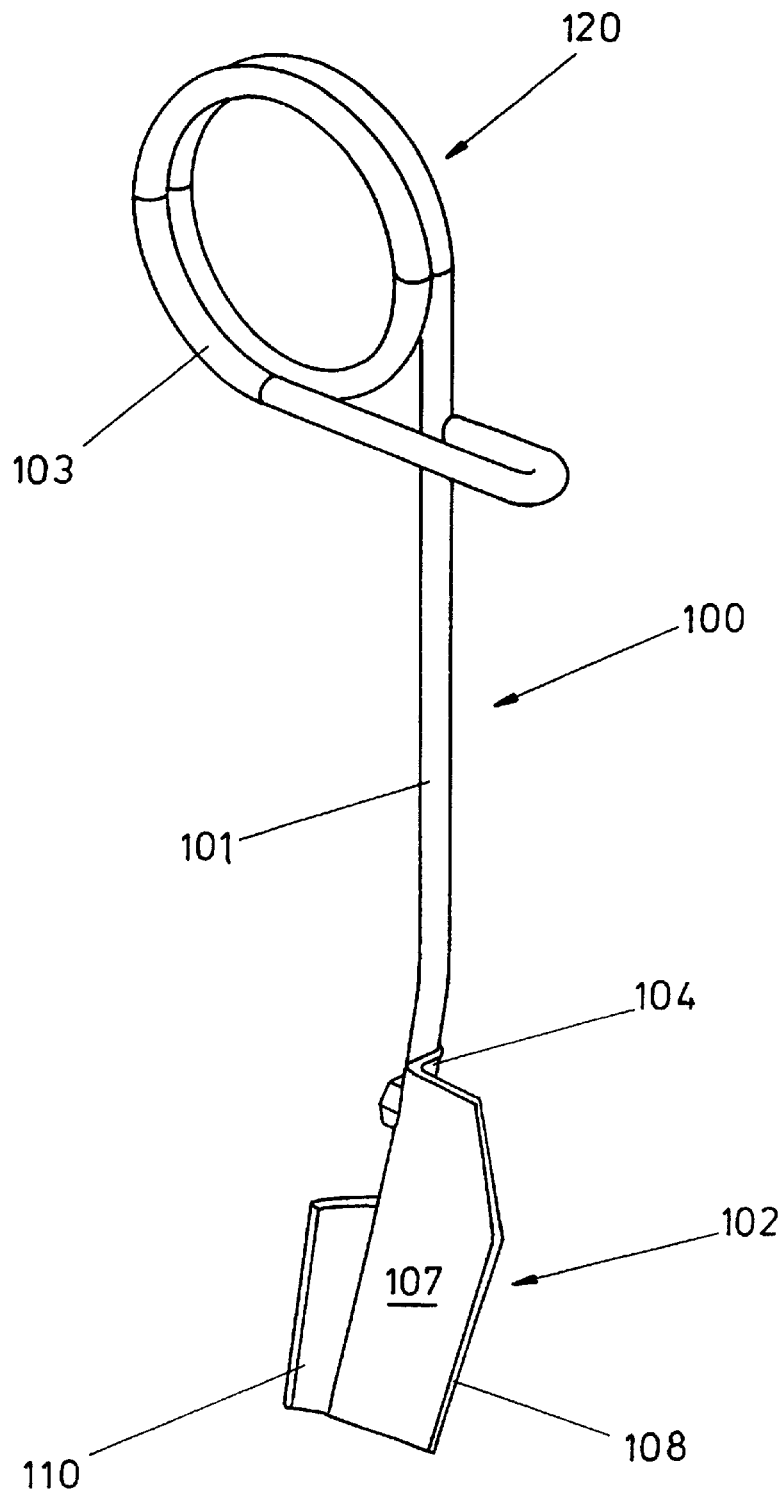
FIG. 3 is a perspective illustration of a tine according to the invention.

The tine 100, with the tine end plate formation 106 has been used in trials, as a set of tines, in a mounted reversible plough with an integrated packer design, as shown in FIG. 3 of the specification of WO95/02315, in which the set of tines replace the levelling board 109. It has performed satisfactorily in most circumstances, but if the soil is extra difficult to work, it is preferable to have an additional set of tines, with the new tine point design, located behind the packer rings disclosed in the specification.

An alternative use of the new design of tines could be:

1. in the front of any harrow, and particularly in the new design of seed harrow as disclosed in EPA 96306433.2 and GB 9614991.9, the disclosure of which is incorporated herein by this reference;
2. in the front of a cultivator.

The new tine design may be used in connection with a packer, and in which case the tines carry out preparatory work on the soil, whereas the following packer rings are then able to carry out further soil-working, and with improved performance.

Under some conditions, the improved result can be so satisfactory that it is possible to carry out seeding immediately on the worked soil, but in tougher conditions, it may be preferable to leave the soil until the spring. In tougher conditions, the leading edge (108) of the new tine point design cuts the slot, and which is widened at the top by the trailing wing formation 110. In winter, the grooves so formed, which are widened near the ground surface, become filled with water, which subsequently freezes, and this expansion of the water when forming ice breaks the soil into smaller clods.

In this situation, it may then be possible, in the spring, to carry out seeding directly, without any further working of the soil, employing the new design of seed harrow as disclosed in EPA 96306433.2 and GB 9614991.9. This contrasts with traditional practice, referred to in the introduction, in which up to six passes sometimes have to be made with a harrow, in the spring time, before satisfactory conditions for seeding can be obtained.

The provision of the new design of tine point, with the plate-like fabrication described above, is mounted advantageously on the lower tip of the shank of the tine, so that when the tine point encounters obstacles in the ground, the natural resilience in the tine design allows the tine point to move backwards and/or sideways, so as to pass by the obstacle. The amount of movement of the tine point will depend on the resistance of the soil, and the relative stiffness of the tines employed.

An additional advantage of the new design of tine points is that they can cut through straw, weeds, and roots of e.g. couch grass. They can also cut through grass roots when ploughing in a meadow, when the tines follow a plough, either in a subsequent operation when mounted on a cultivator, or when incorporated in an integrated combination of a plough and cultivator. The result is that it is much easier to break-up the furrow slice formed by the plough.

Another advantage of the new design of cultivator tine point is that it contributes to the fight against the damaging attack by snails. Snails tend to hide and live in crevices which are created between furrow slices formed by a plough. When conventional harrowing follows ploughing, and before seeding, or when normal direct seeding methods are employed, then only a few of these crevices (hiding the snails) are destroyed. When the crops start to sprout, and when the climate is right, the snails can feed on the sprouting crop, and can destroy a field in a matter of a few days. This is a particular problem, and especially in warmer climates, but even in southern scandinavia e.g. southern Sweden, this is an increasing problem.

To fight this damaging attack by snails, it is current practice to use a lot of pesticides, but this is becoming increasingly unacceptable on ecological grounds.

However, when the new design of tin points are employed in potentially infested areas, in combination with packer rings, the tines can be controlled to operate at a regulated depth. They can then cut through the furrow slices formed by the plough, and also through the crevices between adjacent slices, and the action of the tine point, with its trailing wing formation, forms a slice which becomes widened. When a packer follows, the worked-on ploughed slices and the crevices can then be filled, and particularly the widened groove formation formed by the wing formations becomes filled with soil. It is then very difficult for the snails to come out and attack the growing crop.

Therefore, the new design of tine point makes it possible to work even difficult soils with better results, and with a significant reduction in time and cost.

It will be noted from FIG. 5b that the laterally extending wing formation 110, provided on the trailing edge 109 of the plate 106, is located intermediate the upper and lower ends 111 and 112 respectively of the plate 106, and in fact is located about mid-region, and immediately below the lower edge of the trough-like mounting portion 104 for the lower end of tine shank 101.

It should also be noted that, in addition to being effective in "heavy" or difficult soil conditions, the new design of tine is also advantageous when working in some lighter types of soil. The shape of the plated end of the tine, and particularly the arrangement of the wing, is such that it causes some of the soil to be moved forwardly, as well as laterally, with respect to the tine. This contributes to a significant extent in improving the levelling action of the implement, and in particular in filling in crevices, as well as breaking down the soil.

FIGS. 6 and 7 show modifications made to the design of the plated end, which can be advantageous in some circumstances. Thus, the shape and angle of the wing can be made different, for different types of soil. The most advantageous shaping of the plate, and the wing, will be determined by experience, with different types of soil conditions.

In addition, as shown in FIG. 6, the angle $\alpha$, which is the rearward inclination of part of the leading edge 108, may be varied to suit different soil circumstances, again with the most effective angle being determined by experience.

Furthermore, as shown in FIG. 7, the mounting of the tine on the frame member of the implement (not shown in detail) may be arranged to be adjustable, or alternatively the frame member itself may be adjustable. This also allows variation in the way in which the plated end of the tine is presented to the ground, and different adjustments can be made, by experimentation, to determine the most suitable way in which the plated end of the tine is presented to the ground.

What is claimed is:

1. A tine for mounting on an agricultural soil working implement comprising:
    a mounting portion at the upper end of the tine for mounting the tine in cantilever manner on a frame portion of the implement;
    a shank portion projecting downwardly from the mounting portion;
    a tine point mounted on the lower end of the shank portion;
    the tine point comprising:
        a substantially flat, plate-like cutting blade extending substantially in a vertical plane when secured to the soil working implement and having leading and trailing edges;
        the leading edge being adapted to cut a slit in the ground during forward travel of the implement;
        the cutting blade having first and second laterally projecting wing formations formed on the trailing edge;
        the first wing formation being operative to widen the slit formed by the leading edge; and
        the shank portion being secured to the tine point substantially at the second wing formation.

2. A tine as claimed in claim 1, the second wing formation being located above ground during use.

3. A tine as claimed in claim 1, wherein the connection between the second wing formation and the cutting blade is resiliently deformable.

4. A tine as claimed in claim 1, the tine point being a unitary plate construction.

5. A tine as claimed in claim 1, the second wing formation having a trough like mounting recess formed therein;
    the recess being adapted to receive the lower end of the tine shank.

6. A tine as claimed in claim 5 having a single fastener which secures the shank end non-rotatably in the recess.

7. A tine according to claim 1 in which the mounting portion of the tine includes a coiled spring formation.

8. A tine according to claim 1 in which the first wing portion extends laterally outwardly of said trailing edge in one direction, and the second wing portion extends laterally outwardly of said trailing edge in an opposite direction.

9. A tine according to claim 8 in which the lower edge of the second wing portion is located at or close to the same level as the upper edge of the first wing portion.

10. An agricultural machine having at least one row of tines, as defined in claim 1.

11. An agricultural machine according to claim 10 in which one or more rows of seed distributing coulters are mounted on the apparatus rearwardly of said at least one row of tines.

12. An agriculture machine accordingly to claim 10 in which one or more rows of fertilizer distributing coulters are mounted on the apparatus rearwardly of said at least one row of tines.

13. A tine as recited in claim 1 wherein the lower end of the shank portion is secured to the second wing formation such that the shank is offset from the vertical plane in which the cutting blade is disposed.

14. A tine as recited in claim 1 wherein the second wing formation is disposed vertically higher than the first wing formation when the cutting blade is disposed in the vertical plane.

15. A tine for mounting on an agricultural soil working implement comprising:
    a shank having an upper end and an opposing lower end, the upper end being configured for mounting on the working implement; and
    a tine point mounted on the lower end of the shank, the tine point including:
        a plate-like cutting blade disposed in a plane, the cutting blade extending from a leading end having a leading edge formed thereat to an opposing trailing end;
        a first wing formed on the trailing end of the cutting blade such that the first wing at least partially laterally projects from a first side of the plane when the cutting blade is vertically disposed;
        a second wing formed on the trailing end of the cutting blade such that the second wing at least partially laterally projects from an opposing second side of the plane when the cutting blade is vertically disposed, the second wing being secured to the lower end of the shank and being vertically higher than the first wing when the cutting blade is vertically disposed wherein the lower end of the shank is secured to the second wing such that the shank is offset a distance from the plane in which the cutting blade is disposed.

16. A tine point for mounting on the lower end of a shank projecting from an agricultural soil working implement, the tine point comprising a substantially plate-like body having a leading edge and a trailing edge, the trailing edge having an upper end and a lower end, the upper end of the trailing edge being curved to laterally project from one side of the body, the lower end of the trailing edge being curved to laterally project from the side of the body opposite the upper end of the trailing edge, the upper end of the trailing edge being configured for attachment to the lower end of the shank, such that the lower end of the shank is secured to the tine point substantially at the upper end of the trailing edge.

* * * * *